United States Patent [19]

Bourbeau

[11] 4,355,274

[45] Oct. 19, 1982

[54] LOAD RESPONSIVE CONTROL SYSTEM FOR CONSTANT SPEED INDUCTION MOTOR

[76] Inventor: Frank J. Bourbeau, 5411 Toltec Dr., Santa Barbara, Calif. 93111

[21] Appl. No.: 184,969

[22] Filed: Sep. 8, 1980

[51] Int. Cl.³ .......................... H02K 17/04; H02P 5/40
[52] U.S. Cl. .................................... 318/812; 318/805; 318/729; 323/241
[58] Field of Search ............... 318/729, 798, 805, 812; 323/210, 211, 241, 246

[56] References Cited

U.S. PATENT DOCUMENTS

| | | | |
|---|---|---|---|
| 3,346,794 | 10/1967 | Stemmler | 318/227 |
| 3,441,823 | 4/1969 | Schlabach | 318/221 |
| 3,444,451 | 5/1969 | Schlabach et al. | 318/227 |
| 3,482,157 | 12/1969 | Borden et al. | 318/227 |
| 3,519,910 | 7/1970 | Pfaff et al. | 318/218 |
| 3,538,420 | 11/1970 | Klein | 321/5 |
| 3,723,840 | 3/1973 | Opal et al. | 318/432 |
| 3,935,518 | 1/1976 | Yatsuk et al. | 318/227 |
| 4,052,648 | 10/1977 | Nola | 318/200 |
| 4,078,191 | 3/1978 | Morters et al. | 318/227 |
| 4,091,294 | 5/1978 | Zankl et al. | 318/227 |
| 4,117,408 | 9/1978 | Comstedt | 318/805 X |
| 4,186,334 | 1/1980 | Hirata | 318/805 |
| 4,266,177 | 5/1981 | Nola | 318/212 |

*Primary Examiner*—J. V. Truhe
*Assistant Examiner*—Richard M. Moose
*Attorney, Agent, or Firm*—Richard S. Koppel

[57] ABSTRACT

A voltage control system for an induction motor, consisting of a SCR AC voltage controller with sensing and control circuitry, adjusts the motor voltage in response to the load torque demand, thereby minimizing the motor's magnetizing current and its associated losses. The motor displacement power factor angle, which is responsive to load torque, is sensed by directly sensing the motor voltage, deriving its fundamental or line frequency component, and phase-comparing that component with a similarly derived fundamental component of the motor current. The resulting displacement power factor signal is amplified, together with a stability augmentation signal, to form a phase delay command signal for the AC controller. The stability augmentation signal, representative of the blocking voltage across the AC controller SCRs, is formed by rectifying the 180 Hz single phase sum of the three motor voltage signals.

19 Claims, 14 Drawing Figures

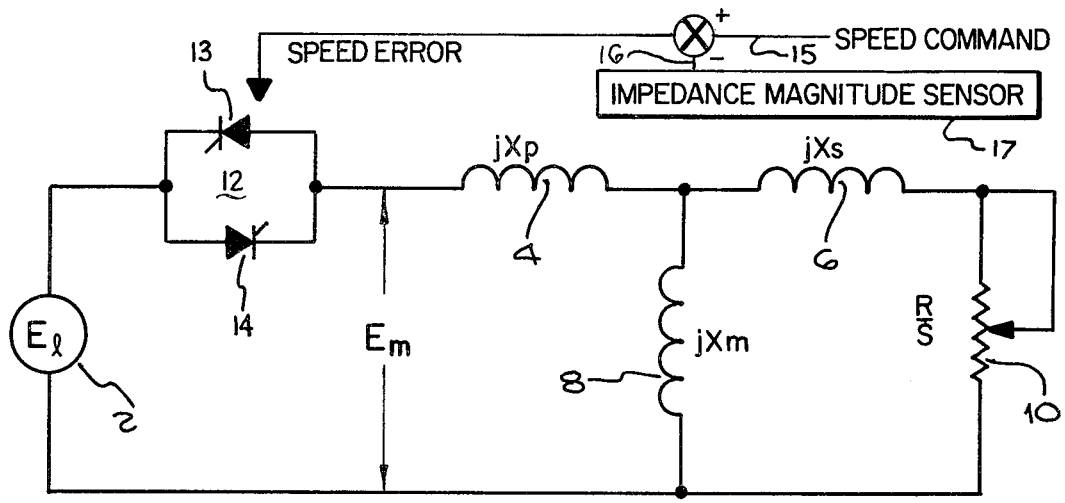
FIG_1  Prior Art
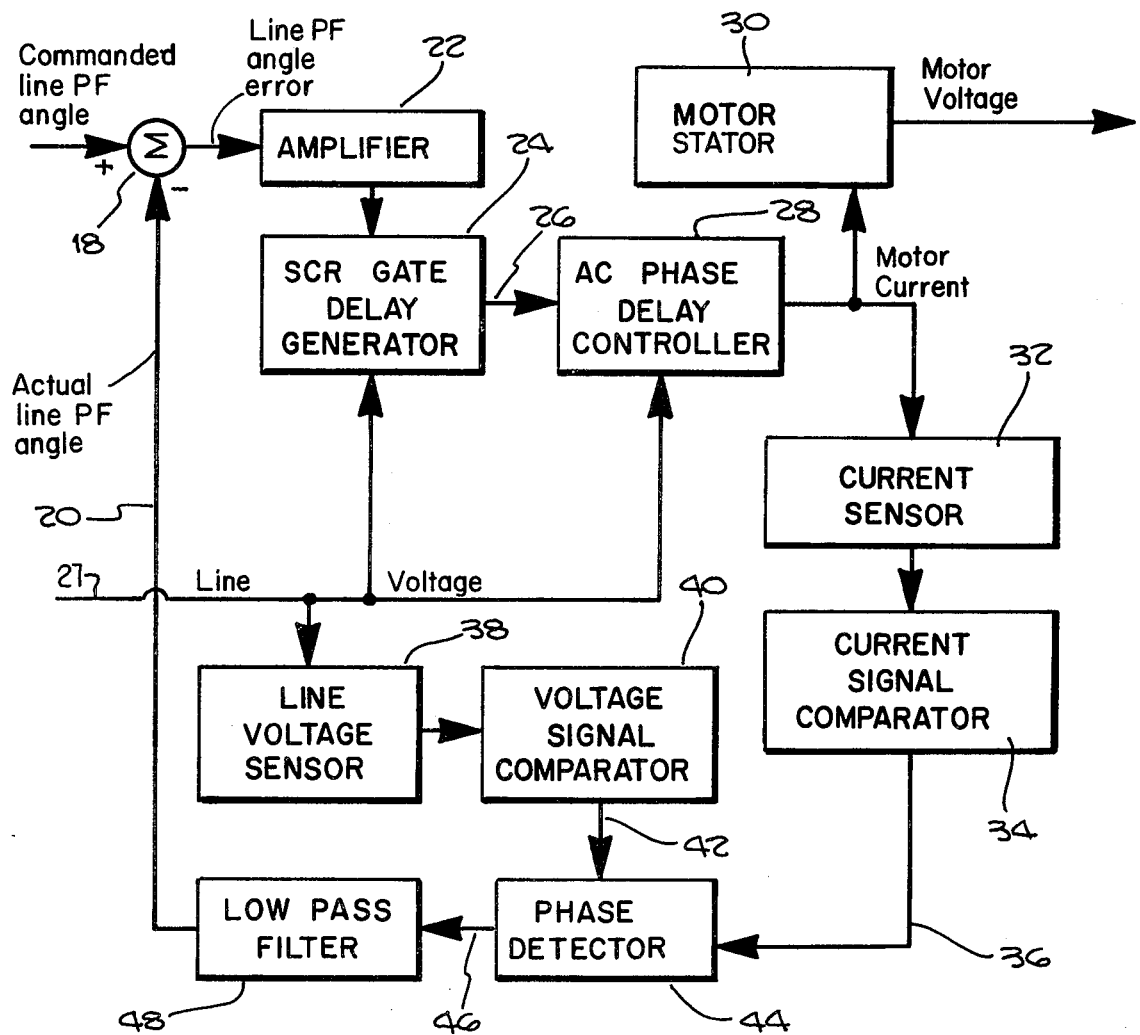
FIG_2  Prior Art

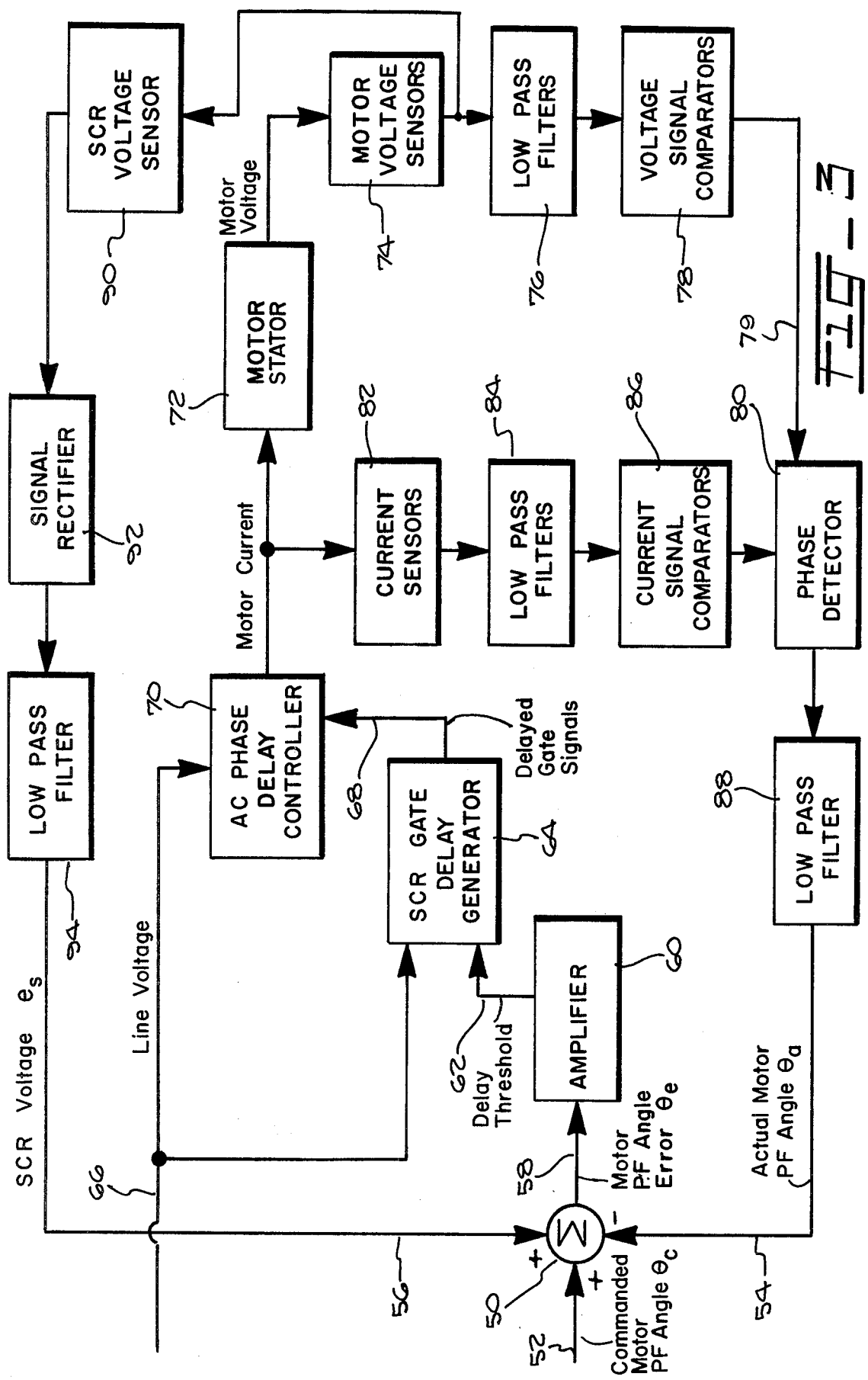

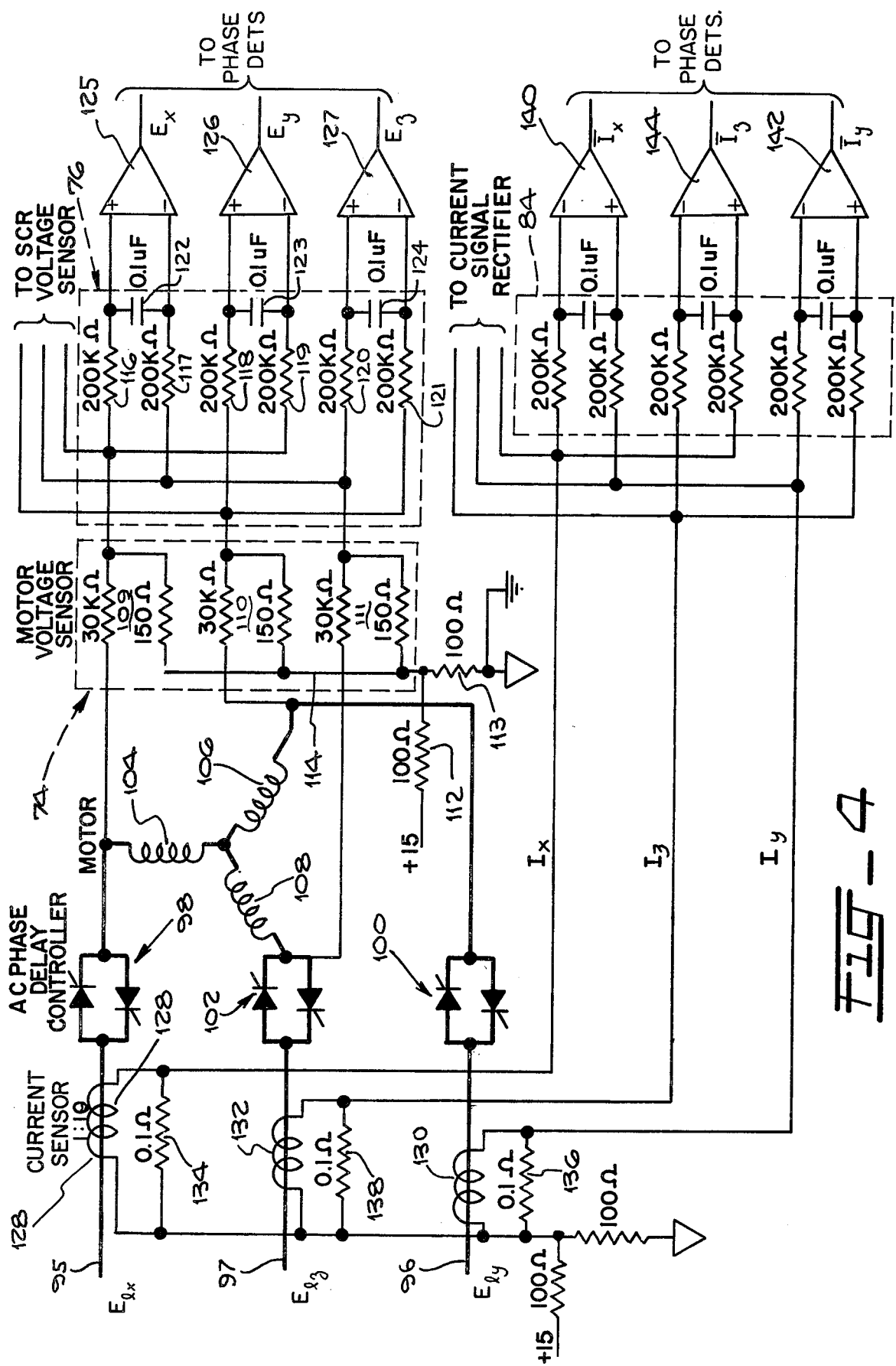

Fig_8

LOAD RESPONSIVE CONTROL SYSTEM FOR CONSTANT SPEED INDUCTION MOTOR

BACKGROUND OF THE INVENTION

1. Field of the Invention

This invention relates to control systems for constant speed, constant frequency, induction motors, and more particularly to control systems designed to produce energy efficient motor operation.

2. Description of the Prior Art

Various techniques have been employed in the past to control the speed of the torque output of a constant frequency induction motor using impedance magnitude or impedance angle as a feedback signal. A speed controller, exemplified by U.S. Pat. No. 3,441,823 to Schlabach, is illustrated in the simplified single phase equivalent circuit shown in FIG. 1. In this circuit the line voltage is represented by voltage source 2, and the motor reactance by primary leakage reactance 4, secondary leakage reactance 6, and magnetizing reactance 8. The rotor resistance R as modified by the slip factor S (slip being the difference between synchronous and actual speed divided by the synchronous speed) is represented by variable resistance 10. An AC phase delay controller circuit 12, consisting of a pair of anti-parallel SCRs 13 and 14, responds to the difference between a speed command signal 15 and a speed feedback signal 16, which is derived from a motor impedance magnitude sensor 17, to regulate the portion of each half-cycle of the line voltage source 2 during which a switching device is conductive to energize the motor. The effective voltage across the motor windings depends on the duration of the switch closure and consequent motor energization; the effective motor voltage increases as the motor is energized earlier in each half-cycle, and decreases as the motor is energized later in each half-cycle. By controlling the period of motor energization in response to the impedance derived speed feedback signal, the circuit of FIG. 1 is able to achieve substantially constant speed operation over a wide range of speed command setpoints with varying load torque. High power operation is not practical, however, because of the rotor losses associated with the excessive slip which is present at speeds significantly less than synchronous speed.

An output torque controller based on impedance angle sensing, the concept of which is illustrated in FIG. 2, was designed to minimize motor losses at light load while operating at close to synchronous speed. This circuit, which is exemplified by U.S. Pat. No. 4,052,648 to Nola, adjusts the motor voltage to match the prevailing load torque requirement of the motor in response to the power factor present at the input to the AC phase delay controller. Power factor is defined as the ratio between (1) the input power and (2) the input voltage multiplied by the input current. For perfect sine wave signals, the power factor is equal to the cosine of the phase angle between the voltage and current signals. In the Nola approach, the motor voltage is varied as a function of the phase angle between the zero crossings of the sine wave input line voltage and the angle at which the motor current flow, which is discontinuous, ceases. Specifically, a commanded line power factor angle is applied as an input to a summing junction 18, which also receives as a negative input a signal over line 20 representing the actual line power factor angle. The output signal from summing junction 18 represents the difference between the commanded and actual line power factor angle, and is employed as an error signal to modify the motor voltage. This error signal is amplified in amplifier 22 and applied to an SCR gate delay generator circuit 24, which produces an output over line 26 consisting of a series of pulses that are delayed from the zero crossings of the line voltage 27 by an amount proportional to the negative of the error signal. Circuit 24 may be implemented by applying the line voltage to a ramp generator, comparing the ramp signals with the amplified error signal, and producing an output when the amplified error signal exceeds the ramp signal, or by other conventional means. The signal along line 26 is delivered to an AC phase delay controller circuit 28. This circuit corresponds to the AC phase delay controller circuit 12 of FIG. 1, and together with the SCR gate delay generator 24 regulates the period of time that the line voltage is connected to the motor terminals.

The output of AC phase delay controller 28 is applied to the motor stator 30. The resulting motor current is sensed by a current sensor circuit 32, which in turn is connected to a current signal comparator circuit 34 which produces an output over line 36 indicating the zero crossings of the motor current. At the same time, the line voltage is sensed by line voltage sensor circuit 38, the output of which is connected to a voltage signal comparator circuit 40 which provides an output on line 42 indicating the zero crossings of the line voltage. Lines 36 and 42 are connected to a phase detector circuit 44, which produces an output over line 46 indicating the phase angle difference between the line voltage and motor current. This signal is routed through a low pass filter 48, and thereafter applied as a DC signal over line 20 to summing junction 18.

While the circuit of FIG. 2 has been found to improve the energy efficiency of motors, various problems have been observed. First, there is a tendency for the motor to stall in response to a step or suddenly applied increase in load torque. If the loop gain is increased in an effort to solve the stalling problem, an element of positive feedback is noted, and the circuit can become instable. This problem has been found to be particularly severe with larger motors. A hunting problem at startup, rather than a smooth transition to synchronous speed, has also been encountered.

SUMMARY OF THE INVENTION

In view of the above problems associated with the prior art, it is an object of the present invention to provide a novel control circuit for a constant speed induction motor that provides an improved transient response to step increases in load torque.

Another object is the provision of a novel control circuit for a constant speed induction motor which avoids the hunting problem found in prior motors on startup.

Still another object is the provision of an energy saving motor controller that can be applied to a wide range of motor types without a major change in the controller parameters.

These and other objects are achieved in the present invention by the provision of means for directly sensing the fundamental component of the non-sinusoidal motor voltage, and for sensing the fundamental component of the non-sinusoidal motor current. The zero crossings of the fundamental components of the motor voltage and motor current are compared to produce a phase difference or displacement power factor angle signal which is representative of the torque load on the motor. Further means are provided which are responsive to the phase difference signal for adjusting the effective motor voltage to a level sufficient, but not substantially greater than necessary, to maintain substantially constant motor speed, thereby resulting in an energy efficient motor operation.

The phase comparing means includes a low pass filter which introduces a delay into the phase difference output signal. To compensate for this delay and improve the transient response of the system to step increases in load torque, means are also provided to sense the voltage across the SCRs of the AC phase delay controller, rectify this voltage to form a wide band width DC signal, and use the DC signal to augment the motor displacement power factor angle signal to provide an adjustment which opposes rapid change in the instantaneous motor voltage. This provides a rapid corrective response to step changes in motor load in advance of the adjustment provided from the delayed motor power factor angle signal.

In order to respond only to true displacement power factor, and not to distortion or apparent power factor resulting from voltage harmonics, the fundamental components of the motor voltage and the motor current are derived, and a signal representing the phase angle between the fundamental voltage and current components is produced in a phase detector circuit. The low pass filter circuits which derive the fundamental signal components of the motor voltage and current produce equal phase delay in the fundamental signal components so that the filter phase delay is effectively cancelled in the phase detector circuit. In addition, improved operation is achieved by utilizing line-to-line signals rather than line-to-ground signals to eliminate extended null ranges in the motor current signal.

The control system further includes a starting circuit which regulates the motor energizing current for a relatively short start mode in which the motor accelerates from zero speed to close to synchronous speed with full voltage applied. The system is shifted from the start mode to the run mode in response to the motor voltage reaching a predetermined level, thereby enabling a short and smooth motor start without the hunting characteristic of the prior art, followed by an energy efficient motor run with motor voltage controlled in proportion to the load torque.

These and other features and advantages of the invention will be apparent to those skilled in the art from the ensuing detailed description of preferred embodiments, taken together with the accompanying drawings, in which:

DESCRIPTION OF THE DRAWINGS

FIG. 1 is a are simplified schematic diagram of the general prior art motor control circuit, described previously;

FIG. 2 is a block diagram of the prior art U.S. Pat. No. 4,052,648 (Nola);

FIG. 3 is a block diagram of one embodiment of the overall motor control circuit of the present invention;

FIG. 4 is a diagram of a circuit for sensing and conditioning the motor voltage and current signals;

DETAILED DESCRIPTION OF PREFERRED EMBODIMENTS

Figure 5:
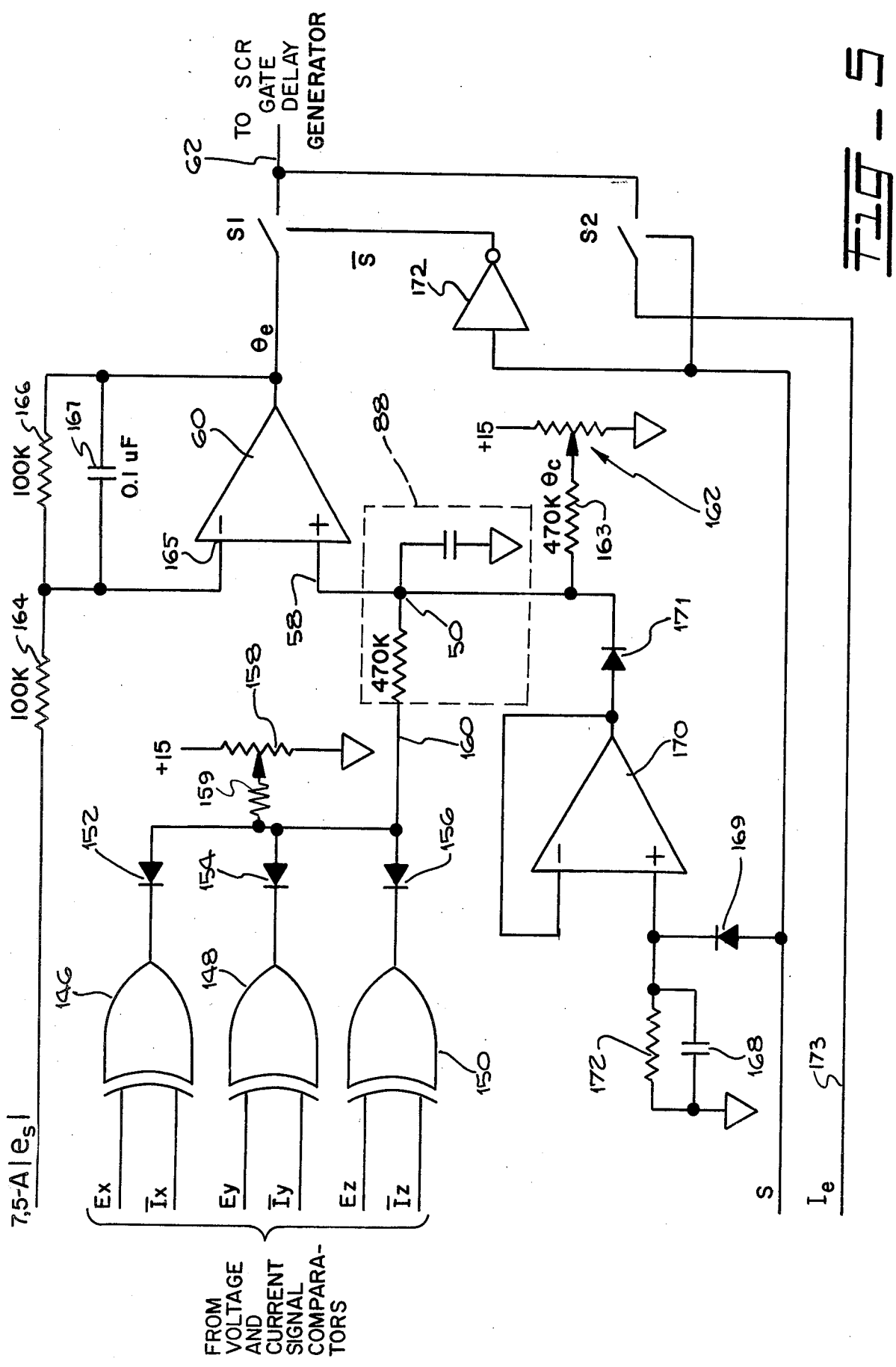
FIG. 5 is a diagram of the phase detector, power factor error amplification and mode transition circuits.

A block diagram of a preferred embodiment of the overall motor control system is shown in FIG. 3. In this embodiment a summing junction 50 receives the following three inputs: a fixed amplitude DC signal which represents the desired or commanded motor power factor angle at which the motor is to operate, over line 52; a DC signal which represents the actual motor power factor angle after processing by low pass filter 88 having a relatively long time constant of typically 0.25 second, as a delayed input over line 54; and a DC signal proportional to the voltage across the six AC phase delay controller SCRs after processing by low pass filter 94 having a relatively short time constant of typically 0.01 second, over line 56. A non-zero signal is produced at the output of the summing junction and delivered over line 58 to amplifier 60. The output of amplifier 60 on line 62 represents a delay threshold signal which is applied to one input of SCR gate delay generator 64, the other input to which is provided from the supply line voltage bus 66. SCR gate delay generator 64 is of conventional design, such as the circuit 24 described previously in conjunction with the prior art. It delivers a train of delayed gate signals over its output line 68 to an AC phase delay controller circuit 70, also of conventional design.

The output of controller 70 is connected to provide energizing current to the motor stator winding impedance 72, thereby producing a motor voltage. The three motor phase voltages are sensed by voltage divider sensing circuits 74, the outputs of which are directed through three identical low pass filter circuits 76 which remove harmonics higher than the fundamental. The remaining fundamental voltage signals from each of the motor phases are applied in pairs to the inputs of the differential voltage signal comparators 78 to produce digital output signals over line 79 having logic level transitions which occur at the zero crossings of the fundamental components of the three motor line-to-line voltages. The output of the latter circuit is delivered to a phase detector circuit 80.

The motor current signals are processed and conditioned in a similar manner. The currents are sensed by current sensor circuits 82, and the resulting signals are processed through low pass filters 84, which introduce a phase shift at the fundamental frequency equivalent to that introduced by the voltage low pass filter 76. It is not strictly necessary to remove harmonics from the current signal as it is for the voltage signal, since the fundamental of the current signal is not substantially shifted from the zero crossings of the total current signal, as the zero crossings of the fundamental component of the voltage signal are shifted in phase from the total voltage signal's zero crossing. However, low pass current filter 84 is used to match the phase shifts introduced by the voltage and current signal processing circuits. Alternatively, the no-load voltage setting for error amplifier 60 could be adjusted to preserve the voltage-current phase relationship.

The output of current low pass filters 84 is delivered to a current signal comparator circuit 86, which converts the phase current signals to line-to-line signals. This conversion step has the advantage of eliminating extended null ranges characteristic of the phase current signals, which otherwise can introduce an ambiguity into the detection of the current phase angle. The outputs of current signal comparators 86 is then delivered as a second input to phase detector circuit 80.

An important feature of the voltage sensing circuitry described thus far is that it operates directly from the motor voltage, rather than from the line voltage as in the Nola patent. The AC phase delay controller introduces a component of phase delay into the motor current which is in addition to the normal phase delay associated with the motor impedance (i.e., the motor power factor angle). The phase detector in Nola accordingly responds to the sum of the motor power factor angle and the angle resulting from delayed SCR gating. It has been discovered that the latter delay component produces a destabilizing positive feedback loop in addition to the normal negative feedback loop associated with control of the motor power factor angle. This destabilizing effect is eliminated in the present invention by sensing the motor voltage directly from the motor windings.

Phase detector 80 responds to the phase difference between the input voltage and current signals to produce a digital output signal, the pulse width of which varies in proportion to the phase angle differential. This output signal is processed through low pass filter 88, which converts the variable pulse width of the digital signal to a variable amplitude DC signal representing the actual motor power factor angle on line 54, for application to summing junction 50.

The control circuit described thus far produces very advantageous results for steady state operation with a constant load torque. However, large step increases in load torque can result in motor instability, particularly when the control system is used for larger, more efficient motors which supply less inherent damping because of their relatively smaller winding and core loss resistances. To alleviate this problem, a feedback circuit comprising SCR voltage sensor 90, signal rectifier circuit 92, and low pass filter 94 is connected from the output of motor voltage sensor 74 to summing junction 50. This feedback circuit senses the rapid drop in motor voltage resulting from step increases in torque load, and provides a signal to summing amplifier 50 to rapidly increase the motor voltage, before the delayed signal from low pass filter 88 has appeared. The feedback circuit produces a very desirable damping of the motor power factor angle control loop previously described.

Referring now to FIG. 4, detailed circuitry for the motor voltage and current sensing and conditioning functions is shown. The line voltage for phases X, Y and Z is applied along voltage supply lines 95, 96 and 97 and AC phase delay controller circuits 98, 100 and 102 to the Y-connected motor phase windings 104, 106 and 108, respectively, and to motor voltage sensor circuits 109, 110 and 111. The latter circuits employ a pair of voltage divider resistors for each motor phase, with the common point of the voltage dividers connected to the midpoint of a pair of resistors 112 and 113 which provides a bias voltage equal to one-half of the low level control circuit supply voltage of typically +15 Vdc. The use of resistive dividers instead of conventional, but more expensive, step down isolation transformers is permissible because the connection between the common point 114 of the 150 ohm voltage divider resistors to the chassis ground is made on the printed wiring board which contains the low voltage power supply and SCR gate drive circuitry, and not through cabling to a separate power supply. The motor voltage signal terminations on the low level control board are thus referenced to a reliable chassis ground, ensuring that high level voltages do not exist on the low level control board.

As another feature of the invention, the fundamental components of the motor voltages, which contribute to the true displacement power factor, are extracted from the actual motor voltage waveform. The latter waveform is distorted by the delayed conduction of the AC phase delay controllers, and includes higher order harmonics which contribute only to apparent, not real, power. The fundamental components are obtained by applying line-to-line replicas of the motor voltage to low pass filters 76 which are comprised of resistors 116, 117, 118, 119, 120 and 121 and capacitors 122, 123 and 124. The filtered motor voltage signals are then applied to differential comparators 125, 126 and 127, which comprise the voltage signal comparators 78 of FIG. 3. The use of line-to-line signals eliminates the third harmonic and its multiples from the voltage waveforms, while the low pass filter capacitors attenuate the remaining fifth, seventh, eleventh, etc. harmonics. The harmonic attenuation achieved is sufficient to produce a good approximation to a line frequency sine wave at the inputs to motor voltage differential comparators 125–127. This produces comparator output signals which accurately define the phase of the fundamental component of the motor voltage waveform. The comparator outputs $E_x$, $E_y$ and $E_z$ are digital signals which are high, typically 13.5 volts for a 15 volt supply voltage (when the filtered line-to-line motor voltage input signal is greater than the 7.5 volt bias voltage), and are low (typically 0.5 volts) when the input signal is less than 7.5 volts.

The logic state transition of $E_x$, $E_y$ and $E_z$ lag the zero crossings of the sine wave input line voltage by two angular components: a fixed phase lag introduced by low pass filter 76, and a variable phase lag introduced by the delayed conduction of the SCRs of AC phase delay controller 70.

Turning now the the current sensing circuitry, the motor current sensors may be placed on either the input line or the actual motor winding, since the current in each winding is identical to the current in the corresponding line phase. In the circuit of FIG. 4, the current sensors comprise current transformers 128, 130 and 132 and associated load resistors 134, 136 and 138 which sense the three input phase lines, respectively. The three current signals are applied through low pass filters 84 and line-to-line signal responsive comparators 140, 142 and 144, similar to those previously described in connection with the motor voltage signal. While in principle the current signal low pass filter 84 has the same attenuation and phase shift as the motor voltage low pass filter 76, in practice it has a shorter time constant which gives the filtered current signal a somewhat lesser phase shift than the filtered voltage signal. This matches the angle sensing capability of phase detector 80 to the power factor angle of the motor, which covers a typical range of 20 degrees to 80 degrees during operation from full load to no load. In the embodiment shown, the phase shift introduced by the low pass voltage filter 76 is 82.4 degrees, while the corresponding current phase shift is 68.1 degrees. The transitions of the digital current signals $I_x$, $I_y$ and $I_z$ at the outputs of current signal compartors 140–144 thus differ in phase from the transitions of the voltage digital signals $E_x$, $E_y$ and $E_z$ by the motor power factor angle minus 14.3 degrees.

Referring now to FIG. 5, circuitry associated with motor power factor angle phase detector 80, power factor angle error amplifier 60, and the start/run mode transition is shown. The motor voltage digital signals $E_x$, $E_y$ and $E_z$ and the inverted current digital signals $\bar{I}_x$, $\bar{I}_y$ and $\bar{I}_z$ are phase detected by the three EXCLUSIVE-OR gates 146, 148 and 150. The outputs of EXCLUSIVE-OR gates 146–150 are logically ANDed by diodes 152, 154 and 156, respectively, in conjunction with potentiometer 158 and resistor 159, to form a variable pulse width, adjustable amplitude signal on output line 160. The repetition rate of this signal is six times the motor (or line) frequency, and the average value ranges from zero when the phase detector input signals are in phase to maximum amount determined by the loop gain determining potentiometer 158 when the input signals are displaced by 60 degrees. Since in the embodiment shown the voltage and current digital signals at the input of the phase detector are displaced by the motor power factor angle less 14.3 degrees, the detector is capable of responding to a motor power factor angle in the range of 14.3 degrees to 74.3 degrees.

The motor power factor angle signal on line 160 is filtered by low pass filter 88 and appears at summing node 50, which in turn is connected over line 58 to the positive input of amplifier 60. A settable motor power factor angle command signal, derived from potentiometer 162, is also connected to summing node 50 through register 163.

The motor power factor angle control loop damping feedback signal, $A|e_s|$, which is proportional to the magnitude of the voltage across the SCRs of AC phase delay controller 70, is applied through resistor 164 to the inverting input 165 of amplifier 60. The gain of amplifier 60 is established by the ratio of feedback resistor 166 and input resistor 164. The bandwidth of the amplifier is determined by the feedback capacitor 167. The amplifier bandwidth is set to a value which gives sufficient attenuation of the 360 Hz ripple voltage in the $A|e_s|$ signal while still providing adequate bandwidth for the $A|e_s|$ signal to provide good transient response to sudden load torque changes.

In principle, potentiometer 158 determines the motor power factor control loop gain and potentiometer 162 supplies a power factor angle command signal. In practice, potentiometer 158 sets the motor torque level at which maximum voltage is applied to the motor (AC phase delay controller 70 is full on). It has been found that the most efficient operation is obtained when the motor voltage reaches the line voltage at somewhat less than rated torque. Further, potentiometer 162 sets the motor voltage at the minimum torque load. This setting can be made with the aid of a power meter to determine the optimum minimum load motor voltage.

Figure 7:
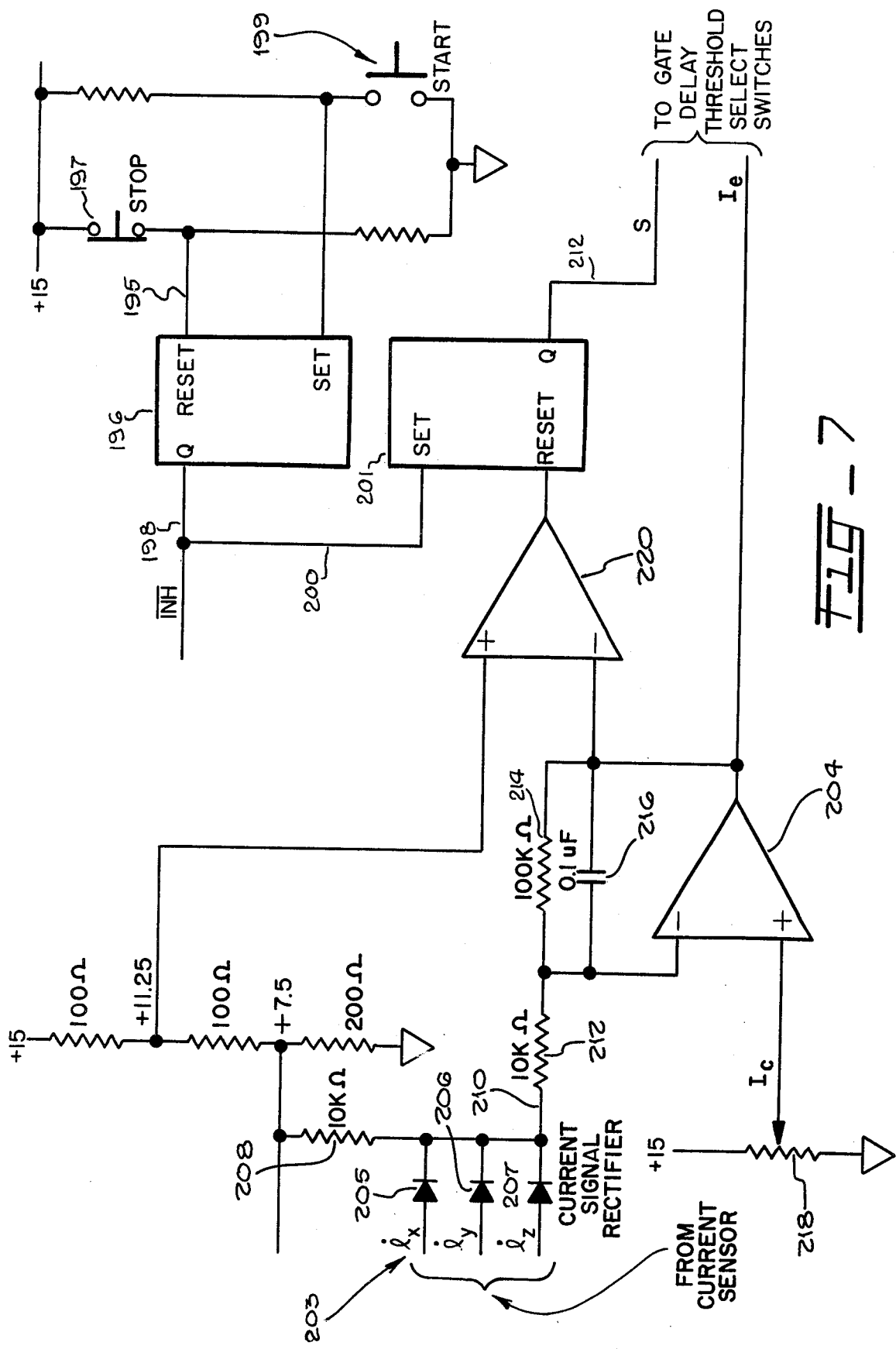
FIG. 7 is a diagram of circuitry employed for current regulation and the transition from the start to the run mode.

Also connected to summing junction 50 is a circuit which serves as a mode transition snubber to prevent a loss of control and subsequent stalled motor condition at the transition from the start to the run mode (the start/run transition circuitry is shown in FIG. 7). In the start mode, a logic signal S is high, charging a capacitor 168 through diode 169 to slightly less than the supply voltage. The voltage output of an amplifier 170, connected as a voltage follower, then goes to its upper saturation limit. An output diode 171 is thus rendered conductive, placing the non-inverting input of amplifier 60 at a voltage level one diode drop less than the voltage output of amplifier 170. Thus, prior to the transition from the START mode to the RUN mode, the output of amplifier 60 is preset to a high level, and is disconnected from line 62 by switch S1. This switch is controlled by the logic signal S from inverter 172.

Prior to the start/run mode transition, another switch S2 is closed to apply the starting current error signal, $I_e$, on line 173 to line 62, and thereby to SCR gate delay generator 64. Just prior to the mode transition, $I_e$ reaches its maximum level. Line 62 is thus at the high level required to produce minimum SCR gate delay and maximum motor voltage. Just after the mode transition switch S1 closes and switch S2 opens, causing the signal on line 62 to take on the value at the output of amplifier 60, which has been preset to a high level as described above. At the transition point, the logic signal S goes from high to low, causing capacitor 168 to discharge through parallel connected resistor 174, with a time constant of typically 0.5 seconds. The output of amplifier 170 follows the discharging capacitor voltage, gradually bringing the non-inverting input of amplifier 60 to the level established by the difference between the motor power factor angle command setting of potentiometer 162, and the actual motor power factor angle. Further discharge of capacitor 168 causes diode 171 to block, and allows normal load responsive operation in the RUN mode.

The circuit for sensing the SCR voltage is shown in FIG. 6(a). Summing resistors 175, 176 and 178 receive the motor voltage signals from sensor 74 while a capacitor 180 blocks the DC bias from the motor voltage signals after summation. The output of capacitor 180 is connected to the inverting input of an operational amplifier 182, the other input of which is connected to receive a split supply voltage bias of 7.5 volts. The output of amplifier 182 is the sum of the motor signal voltages added to 7.5 volts which, for balanced line voltages, becomes the sum of (1) 7.5 volts plus (2) the SCR voltages of AC phase delay controller 70, multiplied by the gain of amplifier 182. This gain is the ratio of the value of feedback resistor 181 to the values of resistors 175, 176 and 178. The output of amplifier 182 is connected to the input resistor 184 of an inverting amplifier 186, and also to a metal-oxide-semiconcuctor field-effect-transistor (MOSFET) switch 188. This switch is closed when a digital signal applied at its control input terminal from line 190 is at a logic 1 level. The digital signal is obtained from comparator 192, which has its non-inverting terminal biased at 7.5 volts, and its inverting input terminal connected to receive the biased and amplified SCR voltage signal at the output of amplifier 182. The output of comparator 192 is thus a logic 1 when the amplified SCR voltage signal $Ae_s$ is less than zero, and a logic zero when $Ae_s$ is greater than zero.

Referring now to FIG. 6(b) the equivalent circuit for $Ae_s$ greater than zero, and switch 188 thus being open, is shown. In this case, the non-inverting input of amplifier 186 is biased to 7.5 volts by equal value resistors 190 and 191, so that the output of unity gain amplifier 186 is 7.5 minus $Ae_s$.

The equivalent circuit for $Ae_s$ less than zero, and switch 188 thus closed, is shown in FIG. 6(c). $Ae_s$ is applied to the non-inverting input of amplifier 186, where it overrides the bias previously supplied to the inverting input terminal. Since $Ae_s$ remains applied to the inverting input of amplifier 186 through input resistor 184, the output of amplifier 186 is then 7.5 volts plus $Ae_s$. The output of amplifier 186 is thus biased at 7.5 volts, with a negative going signal representing the absolute value of the amplified SCR voltage signal as 7.5 minus $|Ae_s|$.

Summarizing the SCR voltage sensing circuit, amplifier 182 and its associated summing resistors form a 180 Hz signal representing the sum of the six SCR voltages from the motor voltage signals. Comparator 192, amplifier 186, switch 188 and associated resistors form a precision full wave rectifier. The rectified composite SCR voltage signal is used to stabilize the motor power factor control loop, and to provide a rapid advance in SCR gate angle in response to a suddenly applied load torque.

The START/RUN mode select circuit is shown in FIG. 7. Initially, the output on line 195 of the START/STOP latch 196 is placed at a logic 1 state because of the normally closed STOP switch 197. This sets the INH output signal on line 198 to a logic 1, thus inhibiting the controller SCR gate signals. Momentary closure of the START switch 199 sets the output of latch 196 to a logic 0 and gating of the controller SCRs commences. The output of the START/STOP latch 196 is also connected via line 200 to the SET input of the START/RUN latch 201. Thus the aforementioned transition of the latch 196 output to a logic 0 causes the output, S, of latch 201 on line 202 to go to logic 1. This actuates switch S2 of FIG. 5, placing the drive in a current regulated START mode.

During the motor acceleration to normal running speed, the motor current is controlled by a current signal rectifier circuit 203 and error amplifier 204. Diodes 205, 206 and 207 convert the outputs of the three AC current sensors to a unipolar signal which appears across load resistor 208. The normal offset voltage of the rectifier diodes serves to block the rectifier output when the AC current signal voltage is less than one diode voltage drop. This signal level is set by selection of the current sensor turns ratio and load resistance to correspond to approximately 150 percent of the full load current. During acceleration, current is regulated to 200 percent or more of the full load current, so that the rectifier provides adequate signal level for closed loop current control.

The rectifier output signal on line 210 is applied through input resistor 212 to the inverting input of operational amplifier 204. The output of amplifier 204 is fed back to the inverting input through the parallel circuit of resistor 214 and capacitor 216. A fixed current command signal $I_c$ from potentiometer 218 is applied to the non-inverting input of amplifier 204. The amplifier output is the error signal $I_e$.

When the motor reaches normal running speed, the motor current drops to the rated value or less, and the current sensor output drops below the diode threshold voltage of rectifier 203. The rectifier output drops to 7.5 volts, and the output of amplifier 204 abruptly rises to a level above 11.25 volts. A START/RUN comparator 220, having its non-inverting input connected to a 11.25 volt source, receives the output of amplifier 204 at its inverting input. It responds to the rise in the output voltage of amplifier 204 when running speed and normal current are reached, by producing a logic zero output when the output of amplifier 204 exceeds the 11.25 volts threshold level of comparator 220. The transition to logic zero by comparator 220 resets latch L2, making its output signal S equal to logic zero. The gate delay threshold switches S1 and S2 of FIG. 5 then transfer control of the SCR gate signals from the current regulating START mode to the motor power factor angle regulating RUN mode.

Figure 8:
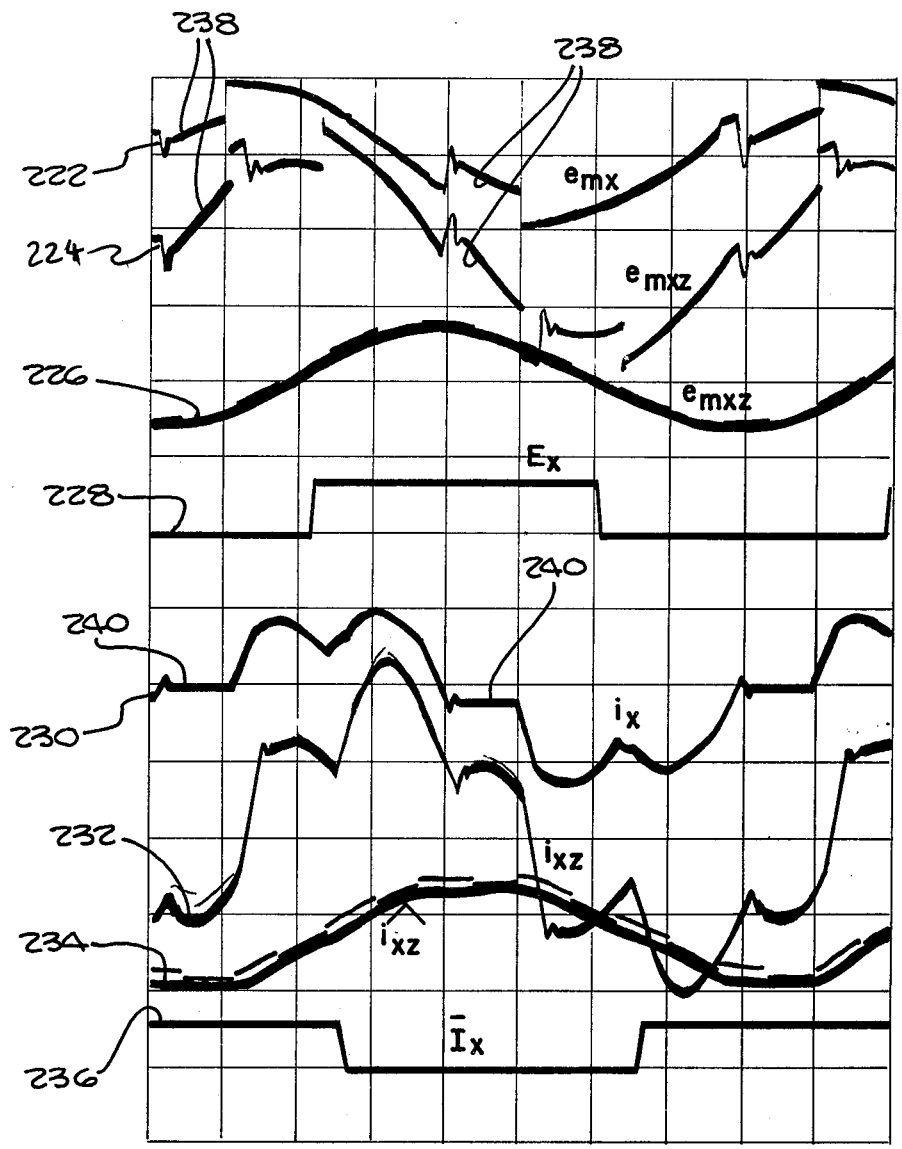
FIG. 8 is a series of traces of the motor voltage and current signal waveforms at various points in the control system.

Referring now to FIG. 8, the following traces of voltages and currents at various points of the control circuit between the motor and signal comparators 78 and 86 are shown:

222: motor line-to-ground voltage
224: motor line-to-line voltage
226: filtered line-to-line voltage
228: output voltage of signal comparator 125
230: motor or line current signal
232: line-to-line current signal
234: filtered line-to-line current signal
236: output of current signal comparator 140

It will be noted that the unfiltered motor voltage signals 222 and 224 are characterized by periodic notches 238, which are produced during the periods that both of the SCRs connected to a motor stator winding are non-conductive. The area of these notches increases, thus lowering the effective motor voltage, when a step increase in load torque is applied. The feedback circuit formed by SCR voltage sensor 90, signal rectifier 92 and low pass filter 94 senses this voltage reduction, and applies a signal to summing junction 50 to compensate for it.

Trace 226 represents the fundamental component of the filtered line-to-line voltage signal, and is shifted in phase from the unfiltered signal 224. The advantageous sine wave characteristic of signal 226 facilitates the production of digital comparator output signal 228.

Referring to the current traces, it is noted that the motor or line current signal 230 has periodic extended null or zero ranges 240 corresponding to the periods that the gate delay generator SCRs are all non-conductive. These null portions are eliminated by using the line-to-line current 232. Again, the fundamental current signal 234 is shifted in phase from the full current signal 232, and facilitates the production of a digital current phase signal 236.

Figure 6:
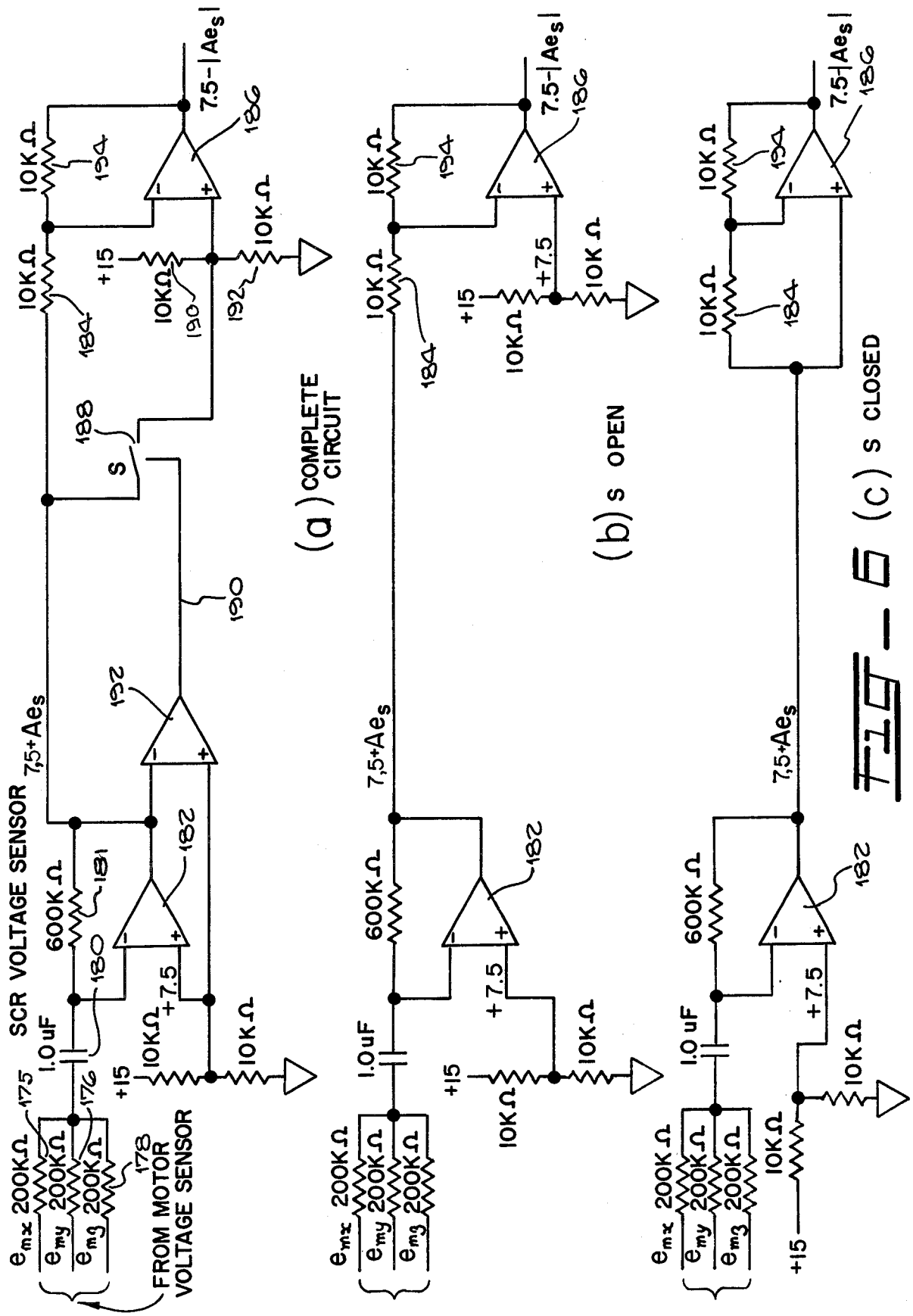
FIGS. 6(a), 6(b), and 6(c) are diagrams of the circuitry employed to sense the voltage across the SCRs of the three phase AC controller, convert the three sets of SCR voltages to a single phase voltage at three times the line frequency and precision rectify the single phase signal to form a DC stability augmentation signal.
Figure 9:
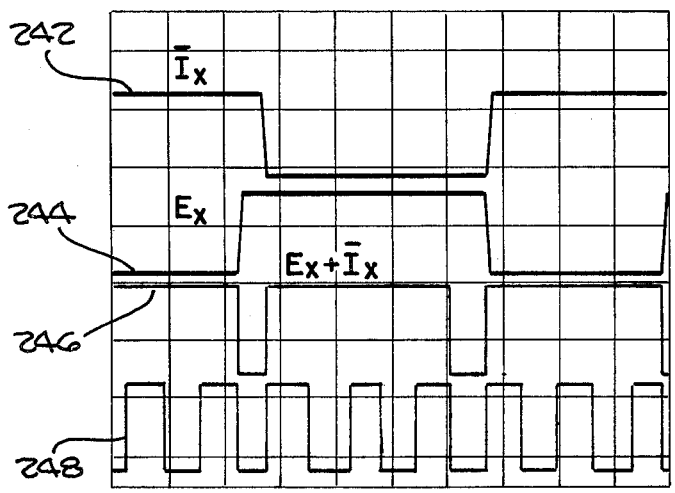
FIG. 9 is a collection of traces of phase detector waveforms.
Figure 10:
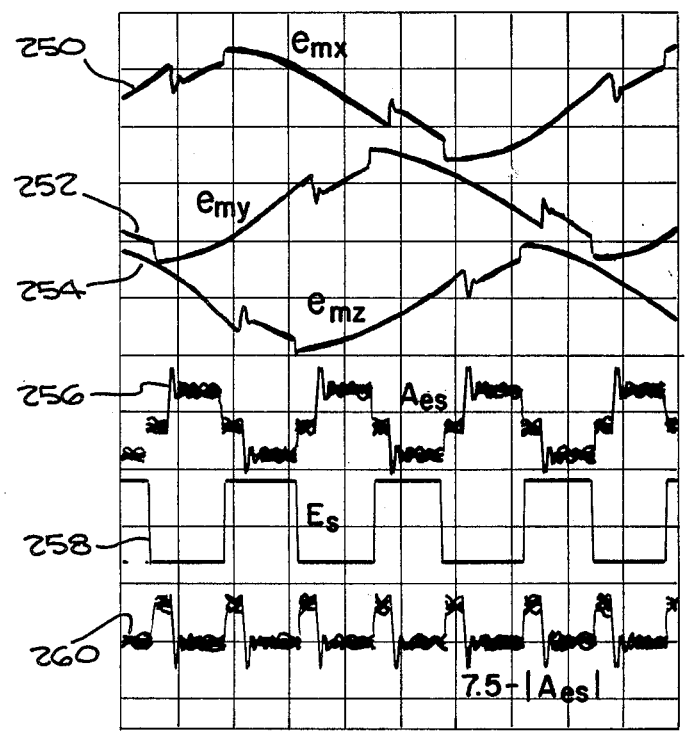
FIG. 10 is a collection of traces of the waveforms in the SCR voltage sensing circuit.
Figure 11:
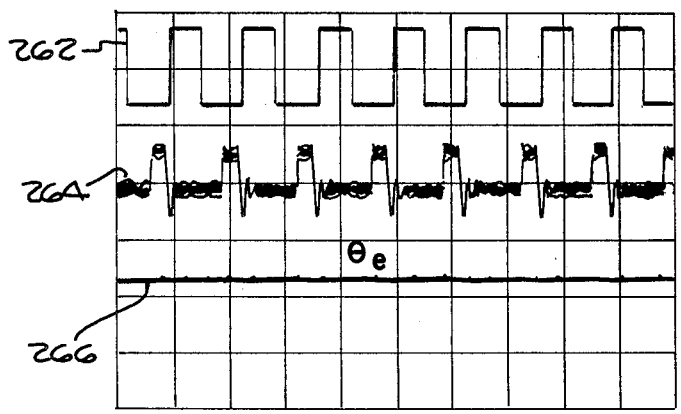
FIG. 11 is a collection of traces of the summing amplifier signals.

Referring now to FIGS. 9–11, the signal waveforms at various locations of the circuits shown in FIGS. 5, 6 and 7, respectively are shown. Inspection of these traces shows the progressive phase information through the aforesaid circuits. The correspondence between the traces and the circuitry is as follows:

242: inverted current digital signal at the input of gate 146;

244: motor voltage digital signal at the input of gate 146;

246: logic signal at the output of gate 146;

248: logic signal from diodes 152–156, having a pulse width proportional to the phase angle of the motor current with respect to the motor voltage over a range of 14.3 degrees to 74.3 degrees;

250: motor line-to-ground voltage signal from voltage sensor 109;

252: motor line-to-ground voltage signal from voltage sensor 110;

254: motor line-to-ground voltage signal from voltage sensor 111;

256: SCR voltage signal at output of amplifier 182;

258: output of comparator 192;

260: rectified SCR voltage signal at output of inverting amplifier 186;

262: phase detector output on line 160;

264: rectified SCR voltage signal at the output of inverting amplifier 186;

266: output of summing amplifier 60, the SCR gate delay threshold signal in the RUN mode.

The embodiment of the invention described above utilizes three phase power factor angle detection. It has been discovered, however, that performance adequate for most applications can be obtained with single phase detection. This approach requires that the low pass filter time constant be long enough to attenuate the 120 Hz ripple component of the phase detector output signal, as opposed to the 360 Hz ripple frequency with three phase detection. Single phase motor power factor angle phase detection permits the elimination of a considerable amount of low level circuitry, and reduces the number of current transformers from three to one.

Figure 12:
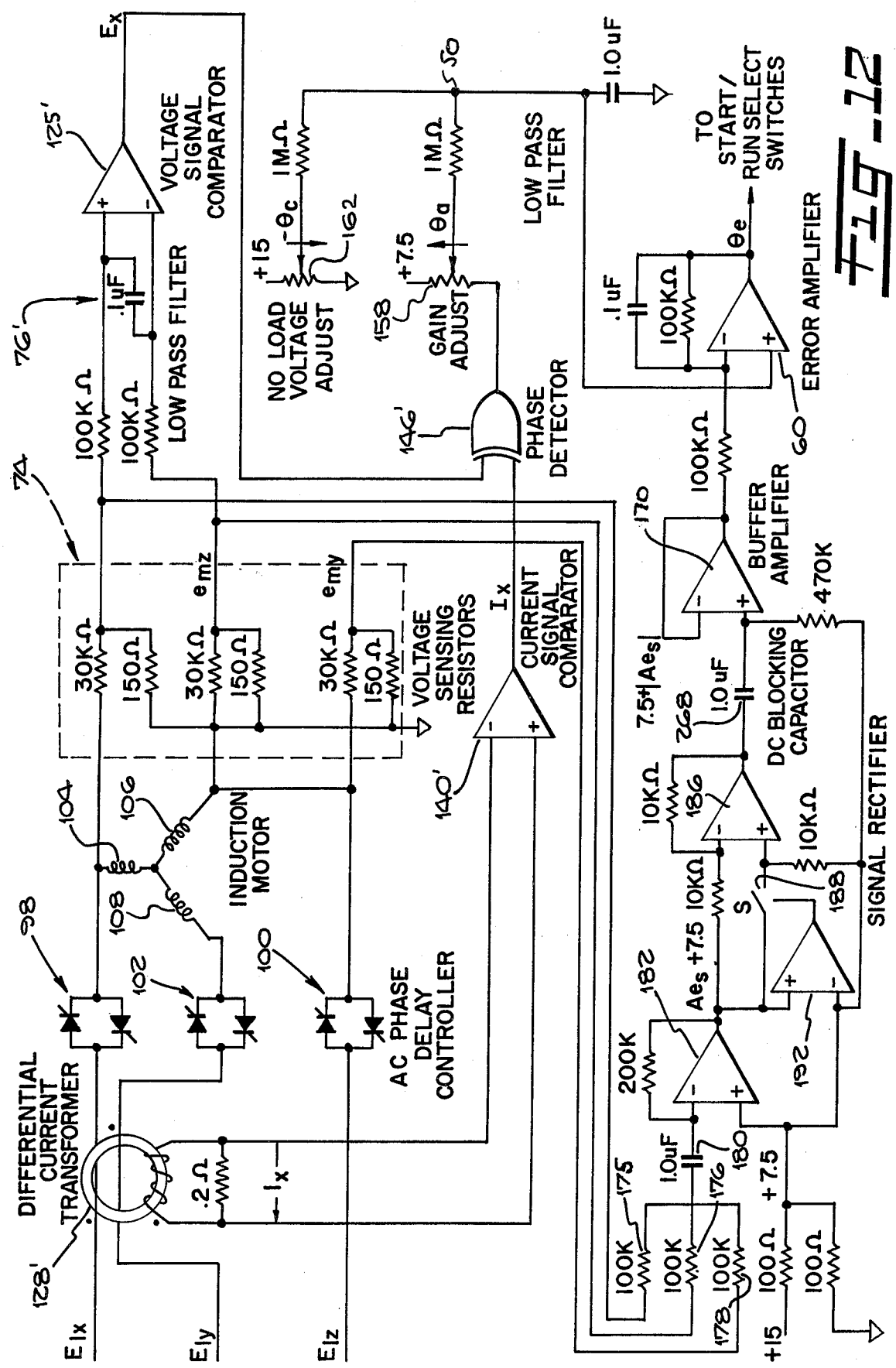
FIG. 12 is a circuit diagram of a simplified embodiment of the invention in which a three phase AC phase delay controller is controlled by a motor power factor angle signal which is derived from the voltage and current of a single motor phase.

A single phase detection circuit is shown in FIG. 12. Corresponding elements are identified by the same reference numerals as in the three phase embodiment, with a prime added to indicate where three separate phase elements have been reduced to one. The necessary current difference signal is obtained by connecting current transformer 128' as a differential transformer with the motor current leads threaded through the core in opposite directions.

Single phase detection reduces the loop gain by a factor of one-third from the gain with three phase detection. If the error amplifier 60' gain is increased by a factor of three to compensate, certain problems can arise as a result of the presence of a 120 Hz ripple component in the phase detector output. These problems are resolved by capacitor coupling the rectified SCR voltage signal with a blocking capacitor 268. The blocking capacitor eliminates the DC component in the rectified SCR voltage signal, thereby reducing the phase detector gain required to obtain a specified variation in motor voltage with load torque.

While various embodiments of the invention have been shown and described, it should be understood that further variations and modifications may occur to those skilled in the art. It is therefore intended that the invention be limited only in terms of the appended claims.

I claim:

1. An energy efficient control system for a constant speed induction motor, comprising:

means for sensing the fundamental component of the motor voltage directly from the motor, means for sensing the motor current, means for comparing the phase angles of the sensed fundamental motor voltage component and the motor current to produce a phase difference signal representative of the torque load on the motor, and AC phase delay controller means responsive to said phase difference signal for adjusting the effective motor voltage to a level sufficient, but not substantially greater than necessary, to maintain substantially constant motor speed, thereby producing an energy efficient motor operation, and AC phase delay controller distorting an input sinusoidal line voltage to a non-sinusoidal motor voltage.

2. The motor control system of claim 1, including a common ground reference for the entire control system, said means for directly sensing the fundamental motor voltage component including a resistive voltage divider circuit connected between the motor and said common ground.

3. The motor control system of claim 1, said means for sensing the motor current comprising means for sensing the current directly from the motor.

4. The motor control system of claim 1, including digitizing means for converting the sensed motor voltage and current signals to digital formats for phase comparison by said comparing means.

5. The motor control system of claim 1, said system comprising the run mode of an overall motor control system, said overall system further comprising means for applying a regulated current greater than the motor's full load current to the motor for a start mode period, and means responsive to the current dropping below a predetermined level for shifting the overall control system from the start to the run mode, thereby enabling a smooth motor start followed by an energy efficient motor run.

6. An energy efficient control system for a constant speed induction motor, comprising:

means for sensing the fundamental component of the motor voltage, means for sensing the motor current, means for comparing the phase angles of the sensed fundamental motor voltage component and the motor current to produce a phase difference signal representative of the torque load on the motor, and AC phase delay controller means responsive to said phase difference signal for adjusting the effective motor voltage to a level sufficient, but not substantially greater than necessary, to maintain substantially constant motor speed, thereby producing an energy efficient motor operation, said phase comparing means introducing a low pass filter delay into the phase difference output signal, and further comprising means for sensing the voltage across the AC phase controller means with a wide bandwidth circuit, said motor voltage adjusting means being responsive to said wide bandwidth voltage sensing means to provide a motor voltage adjustment which opposes rapid changes in the sensed motor voltage, thereby enabling a rapid corrective response to step changes in motor load in advance of the adjustment provided in response to the delayed phase difference signal.

7. The motor control system of claim 6, said system comprising the run mode of an overall motor control system, said overall system further comprising means for applying a regulated current to the motor for a start mode period, and means responsive to the motor voltage reaching a predetermined level for shifting the overall control system from the start to the run mode, thereby enabling a smooth motor start followed by an energy efficient motor run.

8. An energy efficient control system for a constant speed induction motor, comprising:
means for sensing the difference in phase angle between the motor voltage and motor current, and for expressing said difference as a delayed power factor angle signal,
means comprising an AC phase delay controller with an SCR blocking circuit for adjusting the motor voltage in response to a delayed motor power factor angle signal to correct for differences between said signal and desired energy efficient motor power factor angle, and
means for sensing the SCR blocking voltage of said voltage adjusting means with a wide bandwidth circuit, said motor voltage adjusting means being responsive to a signal from said voltage sensing means to provide a motor voltage correction which opposes rapid changes in the sensed instantaneous motor voltage, thereby enabling a rapid corrective response to step changes in motor load in advance of the correction from the delayed power factor angle signal.

9. The motor control system of claim 8, said means for sensing the SCR blocking voltage being connected in a feedback loop with said motor voltage adjusting means.

10. The motor control system of claim 9, further comprising summing means for adding together the delayed power factor angle signal, a feedback signal from the SCR blocking voltage sensing means, and a commanded power factor angle signal to produce said motor voltage correction signal.

11. The motor control system of claim 10, further comprising rectifying means for rectifying said SCR blocking voltage feedback signal prior to its delivery to the summing means.

12. The motor control system of claims 8 or 9, for use with a three-phase motor, said means for sensing the SCR blocking voltage comprising means for adding together the three motor phase voltages to derive a composite single phase 180 Hz signal which is sensitive to step changes in the motor load.

13. An energy efficient control system for a constant speed induction motor system, characterized by a non-sinusoidal motor voltage when the input line voltage is sinusoidal, comprising:
means for sensing the motor voltage directly from the motor to product a motor voltage signal,
means for sensing the motor current to produce a motor current signal,
means for deriving the fundamental component of the sensed motor voltage signal
means for deriving the fundamental component of the sensed motor current signal,
means for comparing the fundamental component of the sensed motor voltage with the fundamental component of the sensed motor current to produce a phase difference signal which is representative of the torque load on the motor, and
means responsive to said phase difference signal for adjusting the effective motor voltage to a level sufficient, but not substantially greater than necessary, to maintain substantially constant motor speed, thereby producing an energy efficient motor operation.

14. The motor control system of claim 13, including digitizing means for converting the fundamental components of the sensed motor voltage and motor current signals to digital formats for phase comparision by said comparing means.

15. The motor control system of claim 13, for use with a three-phase motor, said motor current sensing means including means for sensing the line-to-line motor currents to eliminate extended null ranges present in the line-to-ground motor currents.

16. An energy efficient control system for a constant speed induction motor system, comprising:
means for sensing the motor voltage to produce a motor voltage signal,
means for sensing the motor current to produce a motor current signal,
means for deriving the fundamental component of the motor voltage signal,
means for deriving the fundamental component of the motor current signal,
means for comparing the fundamental component of motor voltage with the fundamental component of motor current to produce a phase difference signal representative of the torque load on the motor, and
means responsive to said phase difference signal for adjusting the effective motor voltage to a level sufficient, but not substantially greater than necessary, to maintain substantially constant motor speed, thereby producing an energy efficient motor operation,
said means for deriving the fundamental component of the motor voltage signal including a first low pass filter means for filtering out higher order harmonics of the motor voltage signal, said system further comprising a second low pass filter means connected to filter out the higher order harmonics of the motor current, while imposing a phase delay on the motor current signal which matches the phase delay imposed on the motor voltage signal by the first low pass filter means.

17. An energy efficient control system with start and run modes for a constant speed induction motor, comprising:
means for applying a regulated current greater than the motor's full load current to the motor for a start mode period,
means for varying the motor voltage in response to the motor power factor angle during a run mode to maintain an energy efficient motor operation, and
means responsive to the motor current dropping below a predetermined level for shifting the control system from the start to the run mode, thereby enabling a smooth motor start followed by an energy efficient motor run.

18. An energy efficient control system for a constant speed induction motor, comprising:
means for directly sensing the motor voltage to produce a first signal,
means for sensing the motor current to produce a second signal,
low pass filter means connected to remove harmonics greater than the fundamental from said first and second signals,
means for converting the resulting fundamentals of the first and second signals to digital formats,
means for comparing the phases of the resulting digital signals to produce a motor power factor angle signal, means for comparing the motor power factor angle signal with a commanded power factor angle signal to produce a power factor angle error signal representing the difference between the motor and commanded power factor angle signals, and means for adjusting the motor voltage to attenuate said power factor angle error signal, thereby producing energy efficient motor operation at an approximately constant motor power factor angle.

19. The motor control system of claim 18, further including low pass filter means operating on and delaying the motor power factor angle signal, and means for sensing the motor voltage, said motor voltage adjusting means being responsive to said voltage sensing means to provide a motor voltage adjustment which opposes rapid changes in the sensed motor voltage, thereby enabling a rapid corrective response to step changes in motor load in advance of the adjustment provided in response to the delayed motor power factor angle signal.

* * * * *